United States Patent [19]

Hoetger et al.

[11] 4,033,436
[45] July 5, 1977

[54] TRANSMISSION AND TORQUE CONVERTER WITH LOCK-UP CLUTCH

[75] Inventors: Robert Arthur Hoetger, St. Clair Shores; James Albert Hagaman, Madison Heights; William Nortman, Grosse Pointe, all of Mich.

[73] Assignee: Chrysler Corporation, Highland Park, Mich.

[22] Filed: May 12, 1975

[21] Appl. No.: 576,402

[52] U.S. Cl. .............................................. 192/3.3
[51] Int. Cl.² ........................................ F16H 41/18
[58] Field of Search ............... 192/3.29, 3.3, 3.31; 74/733

[56] References Cited
UNITED STATES PATENTS

| | | |
|---|---|---|
| 2,726,557 | 12/1955 | Ackerman ..................... 192/3.3 X |
| 2,995,956 | 8/1961 | Moore ........................... 192/3.3 X |
| 3,073,179 | 1/1963 | Christenson ................... 74/733 X |
| 3,163,271 | 12/1964 | Hilpert ......................... 192/3.29 X |
| 3,338,358 | 8/1967 | Christenson et al. ............. 192/3.3 |

Primary Examiner—Benjamin W. Wyche
Attorney, Agent, or Firm—Talburtt & Baldwin

[57] ABSTRACT

A power transmission unit for a motor vehicle comprising a driving member, a hydrokinetic torque converter having an impeller wheel, means drivingly connecting said driving member to said impeller wheel and input shaft, an output shaft, a planetary gear train drivingly connecting said input shaft to said output shaft, a guide wheel, a sleeve surrounding and drivingly connected to said input shaft, a one-way brake device located between said sleeve and said guide wheel, and lock-up clutch means adapted to positively connect the impeller wheel to the runner wheel.

9 Claims, 4 Drawing Figures

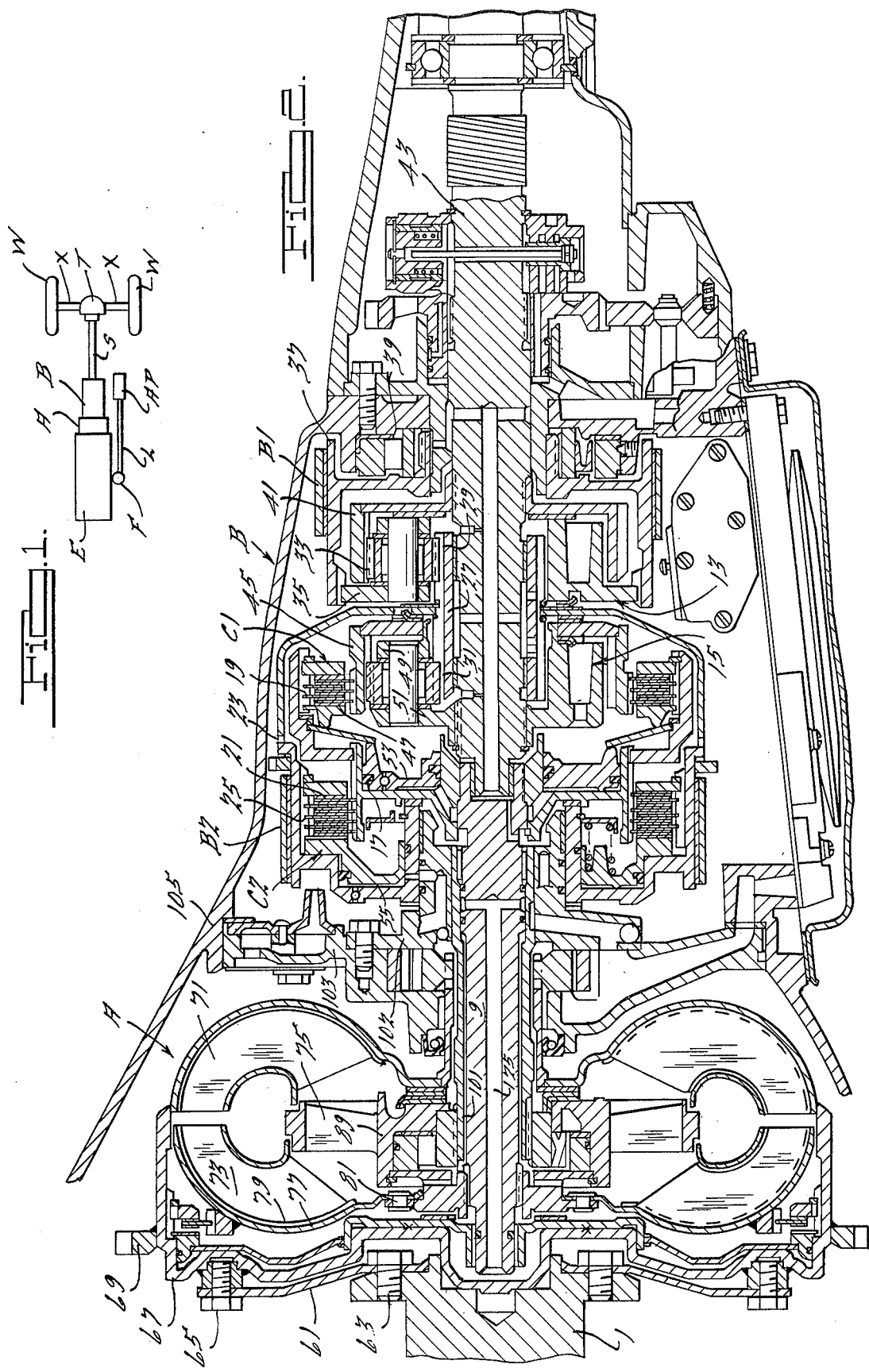

TRANSMISSION AND TORQUE CONVERTER WITH LOCK-UP CLUTCH

BACKGROUND OF THE INVENTION

This invention relates to a power transmission unit primarily intended for motor vehicle use, and more particularly to a transmission of this type which will function to automatically provide a plurality of different forward drive speeds and also a reverse drive, the transmission unit including a torque converter, the elements of which may be mechanically locked together to reduce slippage and increase efficiency.

In automatic transmission for motor vehicles, a torque converter is usually provided to insure a power flow from a stopped condition to a cruising condition which is smooth and shock-free. Using transmission fluid as its only medium of torque transmission, the torque converter slips when the car is at rest with the engine idling, thus eliminating the need for a clutch. For acceleration, its impeller, turbine and stator multiply engine torque in infinitely variable ratios up to a maximum of such as 2.1 to 1 for example. Thus, it is impossible to stall the engine even on the steepest grade. The torque converter merely slips in such a situation.

As the vehicle accelerates from a stopped condition to a cruising condition the torque converter slippage ranges from complete or full down to a minimum or very little amount, such as 5 per cent, so the torque converter achieves a substantially locked up condition (except for such low percentage slip). In such condition there is no torque multiplication and very little slippage. However, prior to reaching a predetermined cruising speed the torque converter does slip. To inhibit slippage, both at low speeds as well as high speeds, various clutch devices have been employed in the past. For example, U.S. Pat. No. 2,667,085 shows a clutch adapted to drivingly connect the impeller and turbine of a torque converter together. This invention is directed to a clutch for locking the torque converter elements together at speeds above a predetermined minimum.

BRIEF SUMMARY OF THE INVENTION

Briefly, this invention relates to a power transmission having a compact and efficient clutch apparatus for locking two torque converter elements together.

One of the primary objects of this invention is to provide apparatus for increasing the efficiency of an automotive transmission.

Another object of this invention is to provide apparatus of the type described which will reduce fuel consumption by the engine to which the automatic transmission is connected.

A further object of this invention is to provide apparatus of the class described which inhibit slippage between relative rotatable elements of a torque converter used in an automatic transmission unit.

Still another object of this invention is to provide apparatus such as described in which hydraulic pressures provided by the operation of the transmission unit are utilized to inhibit slippage between two relatively rotatable elements of a torque converter.

A further object of this invention is to provide apparatus of the class described for locking one element of a torque converter to another element of such torque converter.

Another object of this invention is to provide apparatus of the class described which is economical in construction and efficient in operation.

Another object of this invention is to provide apparatus such as described which is compact and permits a reduction in the length of the transmission over prior known transmissions having apparatus for locking together two elements of a torque converter.

Other objects and advantages will be made apparent as the description progresses.

BRIEF DESCRIPTION OF THE DRAWING

In the accompanying drawings, in which two of various possible embodiments are shown.

FIG. 1 is a schematic view of a motor vehicle drive train that includes a power transmission unit embodying this invention;

FIG. 2 is a sectional elevational view of one embodiment of a pwer transmission unit constructed in accordance with this invention:

Like parts are indicated by corresponding reference characteristics throughout the several views of the drawings.

DESCRIPTION OF PREFERRED EMBODIMENTS

Figure 3:
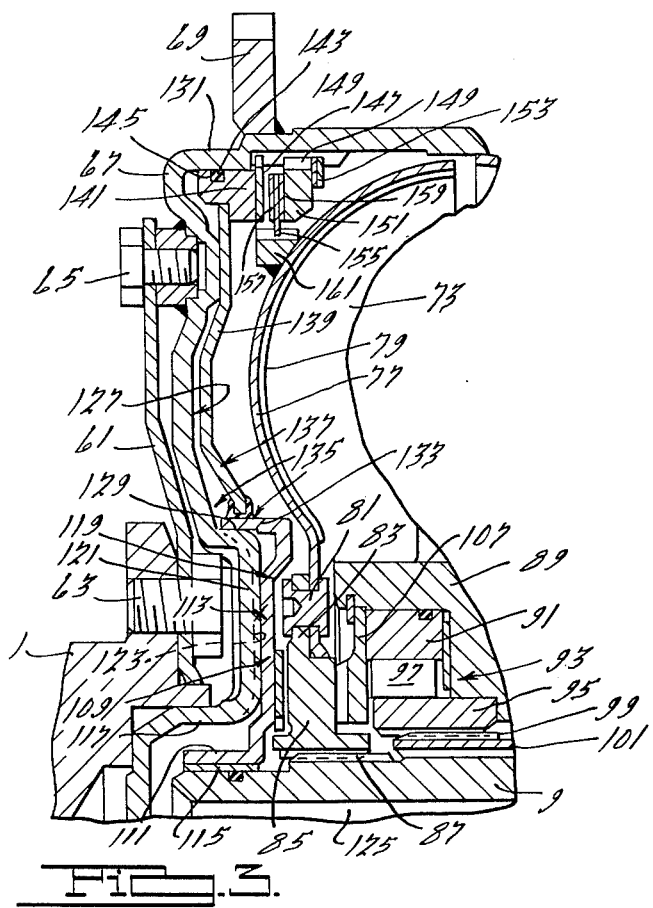
FIG. 3 is an enlarged fragmentary view of FIG. 2.

FIG. 1 of the drawings diagrammatically discloses a motor vehicle power plant and drive train comprising an internal combustion engine E drivingly connected to a power transmission unit that includes a hydrokinetic type of torque converter device or assembly A drivingly connected to a change speed gear box B. The output from gear box B drives a propeller shaft or drive shaft S that transmits drive through a differential unit T and axels X to the rear wheel W of the vehicle. The engine E has a carburetor F that is connected by an accelerator pedal AP through linkage L.

The power transmission unit includes an engine driven shaft 1 connected to the torque converter assembly A, which has a torque converter driven input shaft member 9. The torque converter A will be described in more detail hereinafter. The converter driven shaft 9 member is adapted to transmit drive from the torque converter device A to the planetary gearing of the gear box unit B that is arranged rearwardly of and in series with the torque converter device. The converter driven shaft 9 thus provides the input to the gear box B.

The gear box B generally includes a forward drive clutch C1, a direct drive clutch C2 and a pair of planetary gear trains 13 and 15 that are adapted to cooperate with the torque converter device A to provide means for the transmission of three forward drives and a reverse drive to propeller shaft S. More specifically, a spider assembly 17 drivingly connected to shaft 9 carries a series of annular clutch plates 19 which form part of clutch C1 and a series of clutch plates 21 which form part of clutch C2.

A drum assembly 23 has a series of clutch plates 25 interleaved with clutch plates 21 and is adapted to be prevented from rotational movements bky the application of a brake band B2 which surrounds a portion of the drum as it is adapted to be applied thereto by conventional means (such as a servo mechanism not shown).

Drum 23 is connected to a sleeve 27 carrying the sun gears 29 and 31 of the planetary gear sets 13 and 15, respectively. Gear set 13 includes planet pinions 33 rotatably connected to a carrier assembly 35. Carrier assembly 35 includes a drum portion 37 adapted to be engaged by a brake band B1 and is also constrained against reverse rotation by means of a one-way brake device 39. An annular gear 41 of gear set 13 is connected to an output shaft 43 attached to propeller shaft S.

An annular gear 45 of planetary gear set 14 has a series of clutch plates 47 of clutch C1 mounted thereon. Planet pinions 49 are mounted on a carrier 51 drivingly connected to output shaft 43.

The forward drive clutch C1 is engaged whenever any of the three forward speeds is being utilized and it is disengaged whenever the transmission controls are set in either a Neutral or Reverse position. The direct drive clutch C2 is engaged only when the third or Direct drive forward speed is being transmitted or whenever Reverse drive is being transmitted. The different clutches and brakes that are applied for transmitting the several drive ratios obtainable with this transmission are set forth below:

| Drive Ratio: | Members Applied: |
| --- | --- |
| Low (first) | C1 and B1 or 39 |
| Kickdown (second) | C1 and B2 |
| Direct (third) | C1 and C2 |
| Reverse | C2 and B1 |

The clutches C1 and C2 are adapted to be actuated by hydraulically operated clutch applying piston and cylinder assemblies 53 and 55, respectively. Brake band B2 is adapted to be actuated by a hydraulically operated servo device (not shown) while band B1 is adapted to be applied by a hydraulically operated reverse servo (also not shown).

The components described so far are old and a more specific description of the various components may be found in U.S. Pat. No. 3,650,162.

Referring now particularly to the torque converter assembly A, it is shown to include a drive transmitting ring 61 connected to the engine output shaft 1 by fasteners 63. The drive transmitting ring 61 is drivingly connected by bolts 65 to the torque converter casing 67. The converter casing has an engine starter ring gear 69 mounted on and extending about its periphery. Within the torque converter casing 67 are mounted the several vaned converter wheel elements, namely, the impeller member number 71, the turbine or runner member 73, and the stator or reaction member 75.

The vaned impeller wheel 71 is formed as an integral part of the converter casing 67 and is accordingly adapted to be driven by the engine output shaft 1. The vaned turbine wheel 73 includes an outer trubine shroud 77 and an inner turbine shroud 79. Outer shroud 77 is drivingly connected by rivets 81 to a radially extending flange portion 83 of a hub 85 splined at 87 to shaft 9.

The vaned converter reaction guide member or stator 75 is rotatably mounted within the converter casing 67 by means of a hub 89. This hub 89 is secured to the outer ring 91 of a one-way brake 93 having an inner ring portion 95 and roller 97. The inner ring portion 95 is splined at 99 to an axially extending reaction sleeve 101 secured to the front wall 103 of the transmission housing 105 of the gear box B by a support 102. The one-way brake 93 is arranged such that it will permit only forward rotary movement (clockwise when looking from the torque converter A toward the gear box B) to be transmitted to the stator member 75 by the forward rotation of the impeller 71. The brake continuously prevents rotation of the stator 75 in a reverse or counter clockwise direction. An annular retainer 107 cages the one-way brake parts together.

An annular support plate 109 having an axially extending collar 111 surrounding the forward end of shaft 9 is secured as by welding 113, for example, to the torque converter casing 67. A bushing 115 is provided between the collar 111 and the shaft 9. The diameter of collar 111 is less than an annular shoulder 117 on the torque converter casing. Specifically, plate 109 includes a radially extending portion 119 secured by welding 113 to a radially extending portion or annular plate 121 of casing 67.

Portion 121 has a plurality of recesses 123 formed therein which in cooperation with the front face of portion 119 provide passages for fluid flowing between the forward end of a passage 125 in shaft 9 to a chamber 127 formed by two rearwardly extending annular shoulders 129 and 131 on casing 67. The portion of casing 67 between shoulders 129 and 131 forms an annular plate. The outer end portion of each recess extends forwardly from the rearward face of portion 121 toward the forward wall of chamber 127. Support plate 109 has an annular flange 133 which coooperates with shoulder 131 to form an annular piston bore 135 in which an axially shiftable hydraulically actuated annular piston 137 is reciprocatively mounted. Piston 137 includes a plate 139 and an annular head 141 on the outer periphery of plate 139. A sealing ring 143 is located in a groove 145 and engages shoulder 131.

Head 141 engages an annular disc 147 connected by splines 149 to the casing 67. A second disc 151 is also drivingly connected by splines 149 to the casing and held against rearward movement by retainer 153. An annular clutch disc 155 having friction faces 157 and 159 thereon is spline connected to a mounting ledge 161 welded to the outer shroud 77.

Admission of pressure fluid to the piston bore 135, through passage 123 will move the piston 137 rearwardly so as to grip the clutch plate 155 between discs 149 and 151, thus engaging the lock-up clutch and directly connecting the drive shaft 1 to the torque converter driven shaft 9. Or release of the fluid pressure the fluid within the converter casing 67 will urge the piston 137 forwardly to disengage the clutch and provide a means for the transmission of a fluid transmitted, torque multiplying drive from shaft 8 through the fluid operated torque converter to the shaft 9.

In operation, the clutch may be actuated to lock the input shaft 1 to the torque converter driven shaft 19 when the transmission is in direct drive or at third speed condition or when it is in a second speed condition, or when in both conditions. For example, if the clutch is to be locked up in both second and direct drive, it is disengaged during the shift from first to second and from second to third. More specifically, the clutch will be locked up only after the transmission is completely in a second speed condition during an upshift from first to second. Just prior to the shift from second to direct, the clutch is disengaged and the shift may take place. After the transmission is in its third speed condition the clutch is again locked up. Just prior to kickdown into second the clutch is disengaged to permit the down shift to be accomplished. After the shift is completed, the clutch is then locked up again. The hydraulic circuitry for providing the pressurized fluid and the timing of the application thereof is not part of the present invention.

Figure 4:
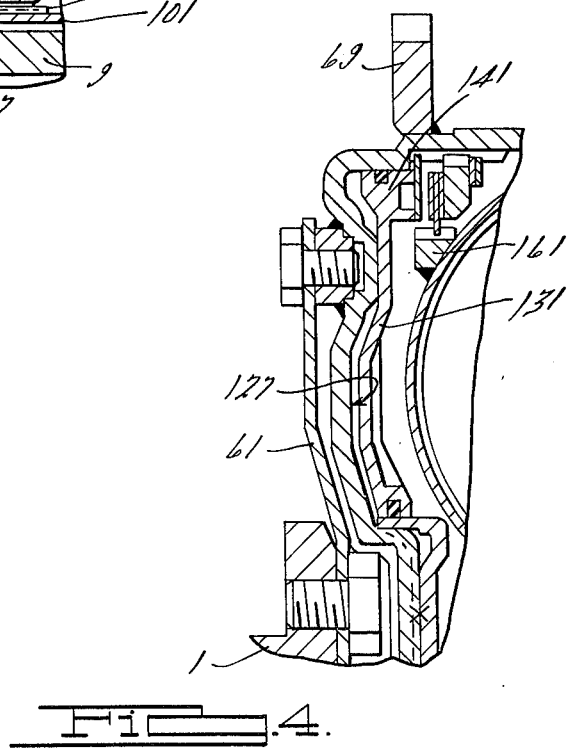
FIG. 4 is a view, similar to FIG. 3, of a modified form of this invention.

A modified form of this invention is shown in FIG. 4 This form is identified to that shown in FIG. 3 except that piston 137 is formed as a single piece with the head 141 being integral with a place 139. This embodiment functions in the same manner as the earlier described embodiment, but the piston is of single piece construction.

It will be seen that the arrangement of the plate 109 and the casing 67 cause the lock-up clutch to be compact, thus permitting the overall length of the transmission to be minimized.

We claim:

1. A power transmission unit for a motor vehicle comprising a driving member (1), a hydrokinetic torque converter having an impeller wheel (71), means (61, 67) drivingly connecting said driving member to said impeller wheel, an input shaft (9), an output shaft (43), a planetary gear train (13, 15) drivingly connecting said output shaft, a runner wheel (73), means (85, 87) drivingly connecting said runner wheel to said input shaft, a guide wheel (75), a sleeve (101 surrounding said input shaft, a one-way brake device (93) located between said sleeve and said guide wheel, and lock-up clutch means (109, 147 - 161) adapted to positively connect the impeller wheel to the runner wheel, said means drivingly connecting said driving member to said impeller wheel including a casing (71) having a first annular plate means (121) extending generally radially with respect to the axis of rotation of said driving member, a second annular plate means (67, between 131 and 133) extending generally radially and offset forwardly with respect to said vehicle from said first annular plate means, an anular axially extending shoulder (129) connecting said first and second annular plate means, and an annular axially extending cylinder wall portion (131) extending rearwardly with respect to said vehicle from the outer periphery of said second annular plate means, said lock-up clutch means including an annular support plate (109) secured to the rearward face of said first annular plate means (121), said annular support plate having a forwardly extending annular flange (133) forming an annular axially extending clinder wall portion, at last one of said annular support plate and said first annular plate means having a recess (123) therein extending from the radially inner edge of the junction thereof to the radially outer edge of the juncture thereof, said clinder wall portions (131, 133) and said second annular plate portion forming a cylinder (127), first annular clutch disc means (147) drivingly connected to said casing, and second annular clutch disc means (155) drivingly connected to said runner wheel, an annular piston (137) in said cylinder adapted to move rearwardly and couple said annular clutch disc means together when fluid flows under pressure through said recess into said cylinder, said support plate (109) further including a forwardly extending annular collar (111) surrounding the forward end of said input shaft, and bushing means (115) between said forward end of said input shaft and the inside of said collar.

2. A power transmission as set forth in claim 1 wherein said piston includes an outer ring-shaped head (141) adapted to engage one of said first annular clutch disc means.

3. A power transmisson as set forth in claim 1 wherein said head is formed integrally with the remainder of said piston.

4. A power transmission unit as set forth in clam 1 wherein said recess (123) is formed in the rearward face of said first annular plate means, said recess extending forwardly from the outer edge of said first annular plate means toward said second annular plate means.

5. A power transmission is set forth in claim 4 wherein said piston includes an outer ring-shaped head (141) adapted to engage one of said first annular clutch disc means.

6. A power transmission as set forth in claim 5 wherein said head is formed integrally with remainder of said piston.

7. A power transmission unit for a motor vehicle comprising a driving member, a hydrokinetic torque converter having an impeller wheel, means drivingly connecting said impeller wheel to said driving member, a runner wheel, an input shaft, an output shaft, a planetary gear train adapted to be drivingly connected between said input and output shafts, means drivingly connecting said runner wheel to said input shaft, a guide wheel, a sleeve surrounding said input shaft, a one-way brake device located between said sleeve and said guide wheel, a lock-up clutch means adapted to positively connect the impeller wheel to the runner wheel, said means drivingly connecting said impeller wheel to said driving member including a casing having a first annular portion extending generally radially with respect to the axis of rotation of said driving member, a second annular portion located outwardly of said first annular portion and forming an annular recess, said first annular portion having at least one recess in the rearward face thereof extending from the readially inner edge thereof, to the said lock-up clutch means including an annular support plate having its inner periphery journalled on the forward end of said input shaft and its outer periphery formed as an axially extending flange, said axially extending flange forming the radially inner wall of a cylinder, the second annular portion of said casing forming the outer wall of said cylinder, a radially extending support plate portion connecting the inner and outer peripheries of said support plate, said radially extending portion being welded to said first annular portion of said casing, first annular clutch disc means drivingly connected to said casing, and second annular clutch means driving connected to said runner wheel, and an annular piston in said cylinder adapted to move rearwardly and couple said annular clutch disc means together when fluid flows under pressure through said recess into said cylinder.

8. A power transmission unit as set forth in claim 1 wherein said piston includes an outer ring-shaped head adapted to engage one of said first annular cluth disc means.

9. A power transmission unit as set forth in claim 8 wherein said head is formed integrally with the remainder of said piston.

* * * * *